(12) United States Patent
Huang et al.

(10) Patent No.: US 11,466,744 B2
(45) Date of Patent: Oct. 11, 2022

(54) ELECTROMAGNETIC MULTISTAGE ADJUSTABLE VARIABLE INERTANCE AND VARIABLE DAMPING DEVICE

(71) Applicant: East China Jiaotong University, Nanchang (CN)

(72) Inventors: Yonghu Huang, Nanchang (CN);
Hongli Zhang, Nanchang (CN);
Mengyuan Lv, Nanchang (CN);
Wenjun Luo, Nanchang (CN);
Yongsheng Liu, Nanchang (CN)

(73) Assignee: East China Jiaotong University, Nanchang (CN)

( * ) Notice: Subject to any disclaimer, the term of this patent is extended or adjusted under 35 U.S.C. 154(b) by 130 days.

(21) Appl. No.: 17/176,312

(22) Filed: Feb. 16, 2021

(65) Prior Publication Data

US 2021/0301896 A1 Sep. 30, 2021

(30) Foreign Application Priority Data

Mar. 24, 2020 (CN) .......................... 202010210568.1

(51) Int. Cl.
| | |
|---|---|
| *F16F 15/03* | (2006.01) |
| *F16F 7/00* | (2006.01) |
| *F16F 6/00* | (2006.01) |
| *E01D 19/00* | (2006.01) |
| *E04B 1/98* | (2006.01) |

(52) U.S. Cl.
CPC .................. *F16F 7/00* (2013.01); *F16F 6/00* (2013.01); *E01D 19/00* (2013.01); *E04B 1/98* (2013.01); *F16F 15/035* (2013.01); *F16F 2222/06* (2013.01); *F16F 2224/0208* (2013.01); *F16F 2228/066* (2013.01); *F16F 2230/18* (2013.01);
(Continued)

(58) Field of Classification Search
CPC .. F16F 7/00; F16F 6/00; F16F 2222/06; F16F 2224/0208; F16F 2228/066; F16F 2232/02; F16F 2234/06; F16F 2236/106; F16F 15/035; F16F 2230/18; H02K 7/104; H02K 7/1025; B60L 7/24
USPC ........................................................ 188/162
See application file for complete search history.

(56) References Cited

U.S. PATENT DOCUMENTS

| | | | | |
|---|---|---|---|---|
| RE34,479 E | * | 12/1993 | Minoura | ............ A63B 21/0051 |
| | | | | 482/61 |
| 5,468,201 A | * | 11/1995 | Minoura | ................ A63B 69/16 |
| | | | | 482/61 |

(Continued)

*Primary Examiner* — Xuan Lan Nguyen
(74) *Attorney, Agent, or Firm* — Carter, DeLuca & Farrell LLP; George Likourezos

(57) ABSTRACT

The present disclosure discloses an electromagnetic multistage adjustable variable inertance and variable damping device. Iron cores are magnetized by winding electromagnetic coil windings outside the iron cores and applying an electric current action to the electromagnetic coil windings, and air gap magnetic fields are generated by the magnetized iron cores and permanent magnets in air gaps to cause the variation of shear damping forces between a driving shear plate and magnet yokes and between driven shear plates and magnet yokes, which avoids that the mechanical properties of an inerter cannot be fully utilized due to the friction caused by mutual contact among parts, thereby realizing multistage real-time adjustability of an instance coefficient and a damping coefficient of the device.

7 Claims, 3 Drawing Sheets

(52) U.S. Cl.
CPC ....... *F16F 2232/02* (2013.01); *F16F 2234/06* (2013.01); *F16F 2236/106* (2013.01)

(56) References Cited

U.S. PATENT DOCUMENTS

| | | | | |
|---|---|---|---|---|
| 5,590,568 | A | * | 1/1997 | Takara ............... H02K 7/02 74/572.1 |
| 5,656,001 | A | * | 8/1997 | Baatz ............ A63B 21/0052 482/61 |
| 2013/0037689 | A1 | * | 2/2013 | Salte ............... F16M 11/18 188/267 |
| 2018/0241297 | A1 | * | 8/2018 | Boeld ............... H02K 49/04 |
| 2018/0320557 | A1 | * | 11/2018 | Defranciscis ........ F01D 25/36 |

\* cited by examiner

US 11,466,744 B2

ELECTROMAGNETIC MULTISTAGE ADJUSTABLE VARIABLE INERTANCE AND VARIABLE DAMPING DEVICE

TECHNICAL FIELD

The present disclosure relates to the technical field of damping devices, and in particular to an electromagnetic multistage adjustable variable inertance and variable damping device.

BACKGROUND

Incentive functions of earthquake, typhoon, or the like will lead to destruction of the structures, such as buildings and bridges, causing casualties and direct or indirect serious economic losses. A recoverable and sustainable design is a development goal of structural designs of civil engineering at present. Active and passive structural control technologies play an important role in the response to the structures under dynamic incentives, such as the earthquake or the typhoon. TMD is widely used in long-span bridges and high-rise buildings all over the world. Under the limitations of the factor of mass ratio, dynamic characteristics of a TMD structure, and the uncertainty of external incentives, the robustness of a TMD control system is reduced, and an MTMD structure can improve its robustness, but the configuration is complex. An inerter can provide an inertance coefficient which is equivalent to hundreds of times a physical mass (equivalent mass), so the requirement of the TMD structure on the mass is greatly reduced. An inerter-based vibration damper is gradually accepted and widely studied, which can achieve better effectiveness and robustness than the traditional TMD.

In the prior art, inerters generally rely on mechanical structures, such as gears and racks, but the inertance is usually unadjustable. There are also some inerters using hydraulic spiral pipelines, which realize adjustable inertance by using inlet and outlet valve control. However, such structures are complex, and provide certain friction, which results in that the mechanical properties of inerters cannot be fully utilized, so it is necessary to study a novel device with variable inertance and variable damping coefficient.

SUMMARY

The objective of the present disclosure is to provide an electromagnetic device with multistage adjustable variable inertance and variable damping coefficient for solving the problems proposed in BACKGROUND. The device is simple and practical, does not rely on an external hydraulic cylinder, and can adapt to a variety of conditions. Iron cores are magnetized by winding electromagnetic coil windings outside the iron cores and applying an electric current action to the electromagnetic coil windings, and the variation of shear damping forces between a driving shear plate and magnet yokes and between driven shear plates and magnet yokes are caused under the action of axial magnetic fields of the magnetized iron cores and the permanent magnets through mutual action of the magnetized iron cores and permanent magnets, which avoids that the mechanical properties of an inerter cannot be fully utilized due to the friction caused by mutual contact among parts, thereby realizing multistage real-time adjustability of an instance coefficient of the inerter. The device is simple in structure and operates in a wide range of applications.

To achieve the above objective, the present disclosure provides the following technical solution:

The electromagnetic multistage adjustable variable inertance and variable damping device provided by the present disclosure includes an outer sleeve, a first end cover, and a second end cover. The outer sleeve, the first end cover, and the second end cover form a built-in cavity. The built-in cavity includes a driving shear plate, a first driven shear plate, a second driven shear plate, a transmission shaft, a thrust bearing, a first magnet yoke, and a second magnet yoke. The first magnet yoke is attached and fixed to the surface of one side, located in the built-in cavity, of the second end cover, and the second magnet yoke is attached and fixed to the surface of one side, located in the built-in cavity, of the first end cover. Iron cores are arranged on the surface of one side, far away from the second end cover, of the first magnet yoke, the surfaces of the two sides of the driving shear plate, and the surface of one side, far away from the first end cover, of the second magnet yoke, and the iron cores are all fixedly connected to the surface of one side, far away from the second end cover, of the first magnet yoke, the surfaces of the two sides of the driving shear plate, and the surface of one side, far away from the first end cover, of the second magnet yoke. A first electromagnetic coil winding, a left second electromagnetic coil winding, a right second electromagnetic coil winding, and a third electromagnetic coil winding are arranged outside the iron cores in the surface of one side, far away from the second end cover, of the first magnet yoke, in the driving shear plate, and in the surface of one side, far away from the first end cover, of the second magnet yoke in sequence in a surrounding manner. Permanent magnets are arranged on the surfaces of both sides of the first driven shear plate and the second driven shear plate, and the permanent magnets are arranged around the transmission shaft annularly. The permanent magnets are all fixedly connected to the surfaces of both sides of the first driven shear plate and the second driven shear plate. Air gaps are formed between the iron cores and the permanent magnets. The driving shear plate and the transmission shaft are fixed integrally; the first driven shear plate is connected to the second driven shear plate through the thrust bearing and the transmission shaft. The first driven shear plate and the second driven shear plate may rotate relative to the transmission shaft.

In a preferred technical solution of the present disclosure, the first electromagnetic coil winding and the third electromagnetic coil winding apply electric current to magnetize the iron cores, so the iron core in the surface of one side, far away from the second end cover, of the first magnet yoke and the permanent magnet in one side, close to the first magnet yoke, of the first driven shear plate are fixed relative to each other because an air gap magnetic field is generated therebetween, and the iron core in the surface of one side, far away from the first end cover, of the second magnet yoke and the permanent magnet in one side, close to the second magnet yoke, of the second driven shear plate are fixed relative to each other because an air gap magnetic field is generated therebetween. Neither the left second electromagnetic coil winding nor the right second electromagnetic coil winding applies electric current, so the iron cores in the surfaces of the two sides of the driving shear plate may rotate relative to the permanent magnet in one side, close to the driving shear plate, of the first driven shear plate and the permanent magnet in one side, close to the driving shear plate, of the second driven shear plate because air gap magnetic fields are not generated therebetween. The transmission shaft may drive the driving shear plate to rotate, and eddy-current damping is generated between the iron cores in the surfaces of the two sides of the driving shear plate and the permanent magnet in one side, close to the driving shear plate, of the first driven shear plate as well as the permanent magnet in one side, close to the driving shear plate, of the second driven shear plate, so that low-stage inertance coefficient and damping coefficient are provided.

In a preferred technical solution of the present disclosure, the first electromagnetic coil winding applies electric current, so the iron core in the surface of one side, far away from the second end cover, of the first magnet yoke and the permanent magnet in one side, close to the first magnet yoke, of the first driven shear plate are fixed relative to each other because an air gap magnetic field is generated therebetween. The third electromagnetic coil winding does not apply electric current, so the iron core in the surface of one side, far away from the first end cover, of the second magnet yoke and the permanent magnet in one side, close to the second magnet yoke, of the second driven shear plate may rotate relative to each other because an air gap magnetic field is not generated therebetween. The left second electromagnetic coil winding does not apply electric current, so the iron core in the left second electromagnetic coil winding in the driving shear plate and the permanent magnet in one side, close to the driving shear plate, of the first driven shear plate may rotate relative to each other because an air gap magnetic field is not generated therebetween. The right second electromagnetic coil winding applies electric current, so the iron core in the right second electromagnetic coil winding in the driving shear plate and the permanent magnet in one side, close to the driving shear plate, of the second driven shear plate are fixed relative to each other because an air gap magnetic field is generated therebetween. The transmission shaft drives the driving shear plate to rotate, and the second driven shear plate rotates along with the driving shear plate, so eddy-current damping is generated by the iron core in the left second electromagnetic coil winding in the driving shear plate and the permanent magnet in one side, close to the driving shear plate, of the first driven shear plate, and eddy-current damping is generated between the permanent magnet in one side, close to the second magnet yoke, of the second driven shear plate and the iron core in the surface of one side, far away from the first end cover, of the second magnet yoke, so that middle-stage inertance coefficient and damping coefficient are provided.

In a preferred technical solution of the present disclosure, the third electromagnetic coil winding applies electric current, so the iron core in the surface of one side, far away from the first end cover, of the second magnet yoke and the permanent magnet in one side, close to the second magnet yoke, of the second driven shear plate are fixed relative to each other because an air gap magnetic field is generated therebetween. The first electromagnetic coil winding does not apply electric current, so the iron core in the surface of one side, far away from the second end cover, of the first magnet yoke and the permanent magnet in one side, close to the first magnet yoke, of the first second driven shear plate may rotate relative to each other because an air gap magnetic field is not generated therebetween. The right second electromagnetic coil winding does not apply electric current, so the iron core in the right second electromagnetic coil winding in the driving shear plate and the permanent magnet in one side, close to the driving shear plate, of the second driven shear plate may rotate relative to each other because an air gap magnetic field is not generated therebetween. The left second electromagnetic coil winding applies electric current, so the iron core in the left second electromagnetic coil winding in the driving shear plate and the permanent magnet in one side, close to the driving shear plate, of the first driven shear plate are fixed relative to each other because an air gap magnetic field is generated therebetween. The transmission shaft drives the driving shear plate to rotate, and the first driven shear plate rotates along with the driving shear plate, so eddy-current damping is generated by the iron core in the first magnet yoke and the permanent magnet, close to the first magnet yoke, in the first driven shear plate, and eddy-current damping is generated by the iron core in the right second electromagnetic coil winding in the driving shear plate and the permanent magnet in one side, close to the driving shear plate, of the second driven shear plate, so that middle-stage inertance coefficient and damping coefficient are provided.

In a preferred technical solution of the present disclosure, neither the first electromagnetic coil winding nor the third electromagnetic coil winding applies electric current, so the iron core in the surface of one side, far away from the second end cover, of the first magnet yoke and the permanent magnet, close to the first magnet yoke, of the first driven shear plate may rotate relative to each other because an air gap magnetic field is not generated therebetween, and the iron core in the surface of one side, far away from the first end cover, of the second magnet yoke and the permanent magnet in one side, close to the second magnet yoke, of the second driven shear plate may rotate relative to each other because an air gap magnetic field is not generated therebetween. Both the left second electromagnetic coil winding and the right second electromagnetic coil winding apply electric current, so the iron core in the left second electromagnetic coil winding in the driving shear plate and the permanent magnet in one side, close to the driving shear plate, of the first driven shear plate are fixed relative to each other because an air gap magnetic field is generated therebetween, and the iron core in the right second electromagnetic coil winding in the driving shear plate and the permanent magnet in one side, close to the driving shear plate, of the second driven shear plate are fixed relative to each other because an air gap magnetic field is generated therebetween. The transmission shaft drives the driving shear plate to rotate, and the first driven shear plate and the second driven shear plate rotate along with the driving shear plate, so eddy-current damping is generated by the iron core in the surface of one side, far away from the second end cover, of the first magnet yoke and the permanent magnet, close to the first magnet yoke, of the first driven shear plate, and eddy-current damping is generated by the iron core in the surface of one side, far away from the first end cover, of the second magnet yoke and the permanent magnet in one side, close to the second magnet yoke, of the second driven shear plate, so that high-stage inertance coefficient and damping coefficient are provided.

In a preferred technical solution of the present disclosure, the outer sleeve, the transmission shaft, the first end cover, and second end cover are all made of non-magnetically/electrically conductive materials; the driving shear plate, first driven shear plate, second driven shear plate are all made of magnetically/electrically conductive materials.

In a preferred technical solution of the present disclosure, the first magnet yoke, the first driven shear plate, the driving shear plate, the second driven shear plate, and the second yoke are all of disc-shaped structures. At least one first electromagnetic coil winding is arranged on the surface of one side, far away from the second end cover, of the first magnet yoke, and the first electromagnetic coil winding is arranged around the transmission shaft annularly. In the present disclosure, six first electromagnetic coil windings are arranged on the surface of one side, far away from the second end cover, of the first magnet yoke. At least one permanent magnet is arranged on each of the surfaces of the two sides of the first driven shear plate, and the permanent magnets are arranged around the transmission shaft annularly. In the present disclosure, six permanent magnets are arranged on each of the surfaces of the two sides of the first driven shear plate, and adjacent permanent magnets have opposite magnetic pole directions and are perpendicular to a main plane of the disc of the first driven shear plate. At least one left second electromagnetic coil winding and at least one right second electromagnetic coil winding are arranged on each of the surfaces of the two sides of the driving shear plate respectively, and the second electromagnetic coil windings are arranged around the transmission shaft annularly. In the present disclosure, six left second electromagnetic coil windings and six right second electromagnetic coil windings are arranged on each of the surfaces of the two sides of the driving shear plate respectively. At least one permanent magnet is arranged on each of the surfaces of the two sides of the second driven shear plate, and the permanent magnets are arranged around the transmission shaft annularly. In the present disclosure, six permanent magnets are arranged on each of the surfaces of the two sides of the second driven shear plate, and adjacent permanent magnets have opposite magnetic pole directions and are perpendicular to a main plane of the disc of the second driven shear plate. At least one third electromagnetic coil winding is arranged on the surface of one side, far away from the first end cover, of the second magnet yoke, and the third electromagnetic coil winding is annularly arranged around the transmission shaft. In the present disclosure, six third electromagnetic coil windings are arranged on the surface of one side, far away from the first end cover, of the second magnet yoke.

The present disclosure has the following beneficial effects:

The present disclosure discloses an electromagnetic multistage adjustable variable inertance and variable damping device. The Iron cores are magnetized by winding electromagnetic coil windings outside the iron cores and applying an electric current action to the electromagnetic coil windings, and the air gap magnetic fields are generated by the magnetized iron cores and the permanent magnets in the air gaps to cause the variation of shear damping forces between the driving shear plate and the magnet yokes and between the driven shear plates and the magnet yokes, which avoids that the mechanical properties of an inerter cannot be fully utilized due to the friction caused by mutual contact among parts, thereby realizing multistage real-time adjustability of an instance coefficient and a damping coefficient of the device.

Figure 1:
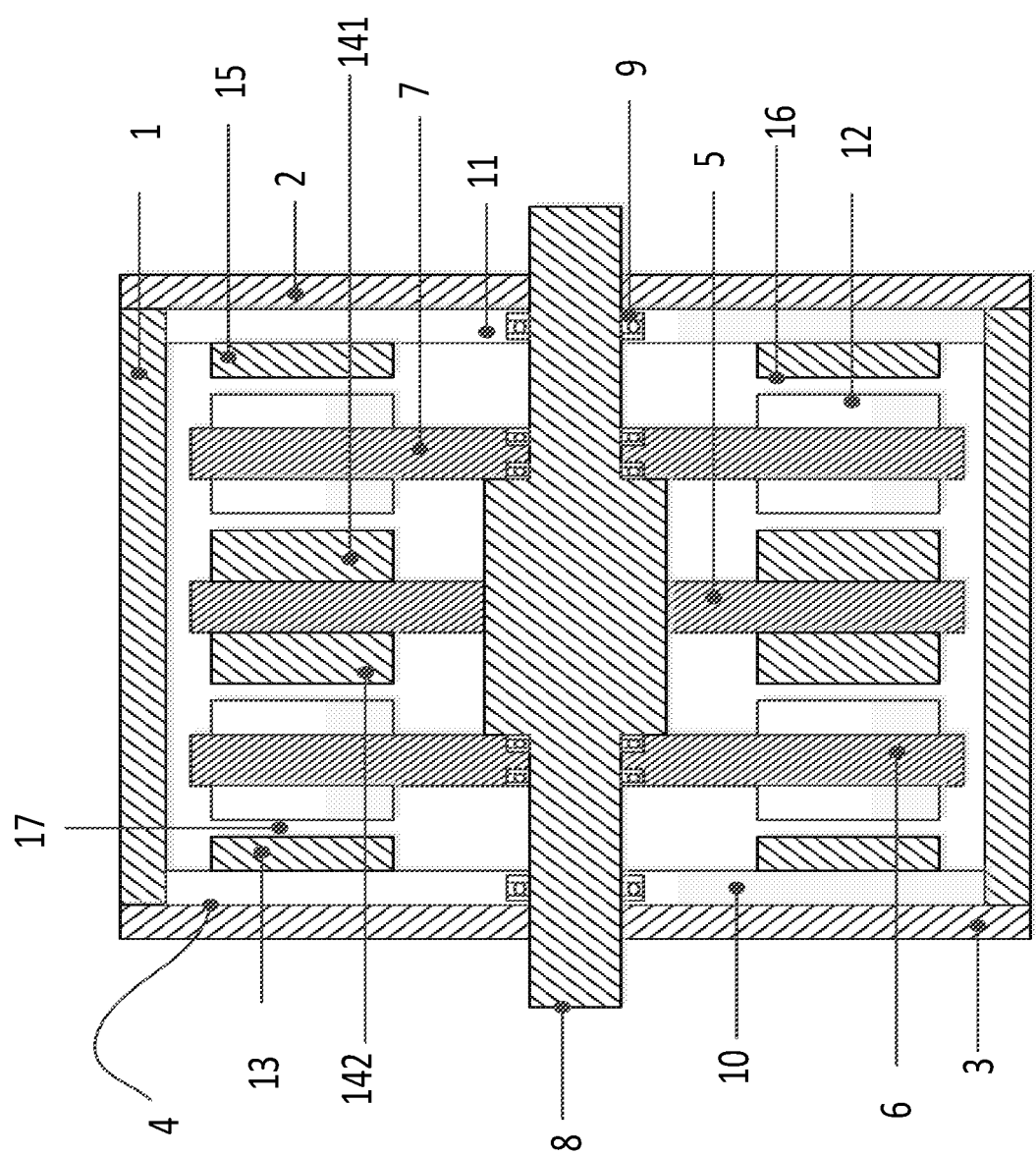
FIG. 1 is a sectional structural view of the present disclosure.
Figure 2:
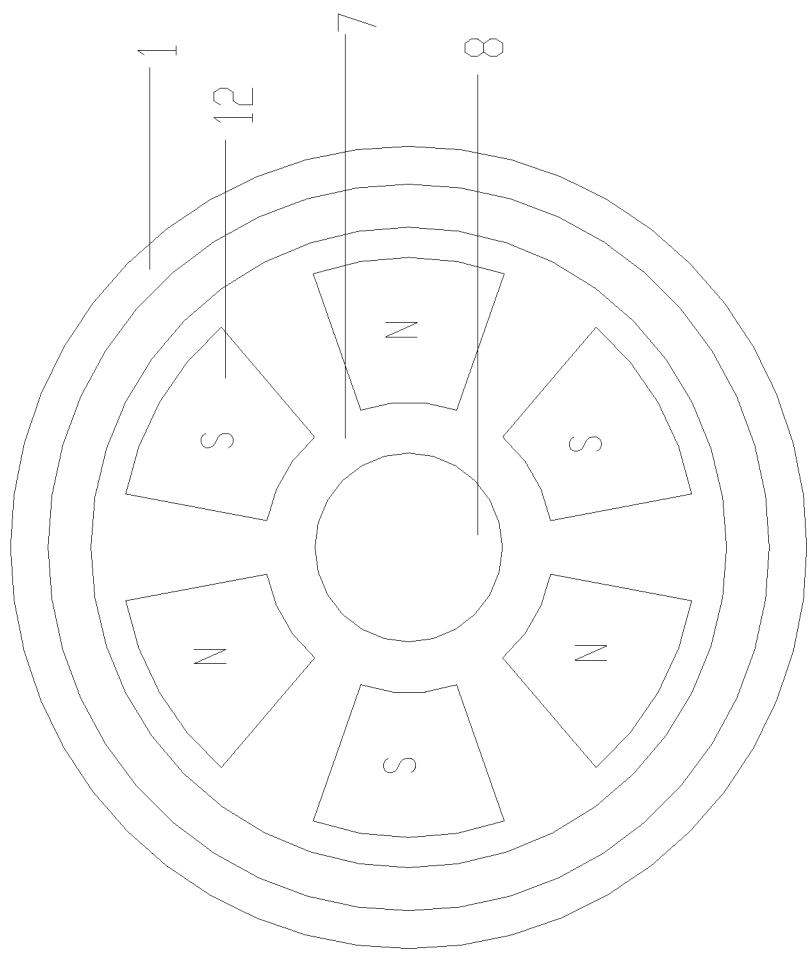
FIG. 2 is a right view of a second driven shear plate in the present disclosure.
Figure 3:
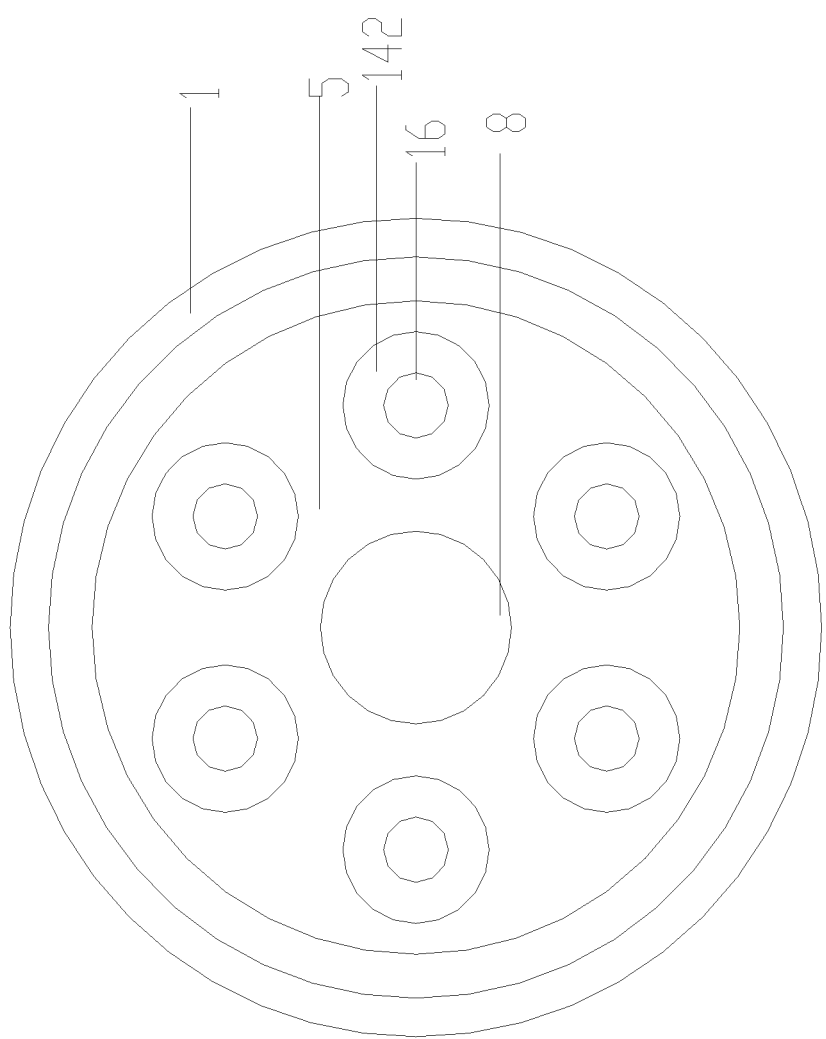
FIG. 3 is a left view of a driving shear plate in the present disclosure.

1-outer sleeve; 2-first end cover; 3-second end cover; 4-built-in cavity; 5-driving shear plate; 6-first driven shear plate; 7-second driven shear plate; 8-transmission shaft; 9-thrust bearing; 10-first magnet yoke; 11-second magnet yoke; 12-permanent magnet; 13-first electromagnetic coil winding; 142-left second electromagnetic coil winding; 141-right electromagnetic coil winding; 15-third electromagnetic coil winding; 16-iron core; 17-air gap.

DETAILED DESCRIPTION

The technical solution of the present disclosure will be further described below in specific implementation manners with reference to accompanying drawings.

An electromagnetic multistage adjustable variable inertance and variable damping device provided by the present disclosure includes an outer sleeve 1, a first end cover 2, and a second end cover 3. The outer sleeve 1, the first end cover 2, and second end cover 3 form a built-in cavity 4, which plays a characteristic role for permanent magnets 12 to generate air gap magnetic fields in a magnetic field. Further, the built-in cavity 4 includes a driving shear plate 5, a first driven shear plate 6, a second driven shear plate 7, a transmission shaft 8, a thrust bearing 9, a first magnet yoke 10, and a second magnet yoke 11. The first magnet yoke 10 is attached and fixed to the surface of one side, located in the built-in cavity 4, of the second end cover 3, and the second magnet yoke 11 is attached and fixed to the surface of one side, located in the built-in cavity 4, of the first end cover 2. Iron cores 16 are arranged on the surface of one side, far away from the second end cover 3, of the first magnet yoke 10, the surfaces of the two sides of the driving shear plate 5, and the surface of one side, far away from the first end cover 2, of the second magnet yoke 11, and the iron cores 16 are all fixedly connected to the surface of one side, far away from the second end cover 3, of the first magnet yoke 10, the surfaces of the two sides of the driving shear plate 5, and the surface of one side, far away from the first end cover 2, of the second magnet yoke 11. A first electromagnetic coil winding 13, a left second electromagnetic coil winding 142, a right second electromagnetic coil winding 141, and a third electromagnetic coil winding 15 are arranged outside the iron cores 16 in the surface of one side, far away from the second end cover 3, of the first magnet yoke 10, in the driving shear plate 5, and in the surface of one side, far away from the first end cover 2, of the second magnet yoke 11 in sequence in a surrounding manner. Permanent magnets 12 are arranged on the surfaces of both sides of the first driven shear plate 6 and the second driven shear plate 7. The permanent magnets 12 are arranged around the transmission shaft 8 annularly. The permanent magnets 12 are all fixedly connected to the surfaces of both sides of the first driven shear plate 6 and the second driven shear plate 7. Air gaps 17 are formed between the iron cores 16 and the permanent magnets 12. The driving shear plate 5 and the transmission shaft 8 are fixed integrally. The first driven shear plate 6 is connected to the second driven shear plate 7 through the thrust bearing 9 and the transmission shaft 8. The first driven shear plate 6 and the second driven shear plate 7 may rotate relative to the transmission shaft 8. In such a structure, the iron cores 16 can be magnetized by an operator by controlling to apply electric current in the electromagnetic coil windings, and the iron cores 16 and the permanent magnets 12 form high and uniform magnetic flux density in the air gaps 17 to produce air gap magnetic fields; the iron cores 16 can also not be magnetized by the operator by controlling not to apply electric current in the electromagnetic coil windings, and the iron cores 16 and the permanent magnets 12 do not generate an air gap magnetic field in the air gaps 17. In conclusion, the operator can realize multistage real-time adjustability of an inertance coefficient and a damping coefficient of the device by controlling the on-off of the electric current in the electromagnetic coil windings.

In order to provide low-stage inertance coefficient and damping coefficient, further, the first electromagnetic coil winding 13 and the third electromagnetic coil winding 15 apply electric current to magnetize the iron cores 16, so the iron core 16 in the surface of one side, far away from the second end cover 3, of the first magnet yoke 10 and the permanent magnet 12 in one side, close to the first magnet yoke 10, of the first driven shear plate 6 are fixed relative to each other because an air gap magnetic field is generated therebetween, and the iron core 16 in the surface of one side, far away from the first end cover 2, of the second magnet yoke 11 and the permanent magnet 12 in one side, close to the second magnet yoke 11, of the second driven shear plate 7 are fixed relative to each other because an air gap magnetic field is generated therebetween. Neither the left second electromagnetic coil winding 142 nor the right second electromagnetic coil winding 141 applies electric current, so the iron cores 16 in the surfaces of the two sides of the driving shear plate 5 may rotate relative to the permanent magnet 12 in one side, close to the driving shear plate 5, of the first driven shear plate 6 and the permanent magnet 12 in one side, close to the driving shear plate 5, of the second driven shear plate 7 because air gap magnetic fields are not generated therebetween. The transmission shaft 8 may drive the driving shear plate 5 to rotate, and eddy-current damping is generated between the iron cores 16 in the surfaces of the two sides of the driving shear plate 5 and the permanent magnet 12 in one side, close to the driving shear plate 5, of the first driven shear plate 6 as well as the permanent magnet 12 in one side, close to the driving shear plate 5, of the second driven shear plate 7, so that low-stage inertance coefficient and damping coefficient are provided.

In order to provide middle-stage inertance coefficient and damping coefficient, further, the first electromagnetic coil winding 13 applies electric current, so the iron core 16 in the surface of one side, far away from the second end cover 3, of the first magnet yoke 10 and the permanent magnet 12 in one side, close to the first magnet yoke 10, of the first driven shear plate 6 are fixed relative to each other because an air gap magnetic field is generated therebetween. The third electromagnetic coil winding 15 does not apply electric current, so the iron core 16 in the surface of one side, far away from the first end cover 2, of the second magnet yoke 11 and the permanent magnet 12 in one side, close to the second magnet yoke 11, of the second driven shear plate 7 may rotate relative to each other because an air gap magnetic field is not generated therebetween. The left second electromagnetic coil winding 142 does not apply electric current, so the iron core 16 in the left second electromagnetic coil winding 142 in the driving shear plate 5 and the permanent magnet 12 in one side, close to the driving shear plate 5, of the first driven shear plate 6 may rotate relative to each other because an air gap magnetic field is not generated therebetween. The right second electromagnetic coil winding 141 applies electric current, so the iron core 16 in the right second electromagnetic coil winding 141 in the driving shear plate 5 and the permanent magnet 12 in one side, close to the driving shear plate 5, of the second driven shear plate 7 are fixed relative to each other because an air gap magnetic field is generated therebetween. The transmission shaft 8 drives the driving shear plate 5 to rotate, and the second driven shear plate 7 rotates along with the driving shear plate 5, so eddy-current damping is generated by the iron core 16 in the left second electromagnetic coil winding 142 in the driving shear plate 5 and the permanent magnet 12 in one side, close to the driving shear plate 5, of the first driven shear plate 6, and eddy-current damping is generated between the permanent magnet 12 in one side, close to the second magnet yoke 11, of the second driven shear plate 7 and the iron core 16 in the surface of one side, far away from the first end cover 2, of the second magnet yoke 11, so that middle-stage inertance coefficient and damping coefficient are provided.

In order to provide middle-stage inertance coefficient and damping coefficient, further, the third electromagnetic coil winding 15 applies electric current, so the iron core 16 in the surface of one side, far away from the first end cover 2, of the second magnet yoke 11 and the permanent magnet 12 in one side, close to the second magnet yoke 11, of the second driven shear plate 7 are fixed relative to each other because an air gap magnetic field is generated therebetween. The first electromagnetic coil winding 13 does not apply electric current, so the iron core 16 in the surface of one side, far away from the second end cover 3, of the first magnet yoke 10 and the permanent magnet 12 in one side, close to the first magnet yoke 10, of the first second driven shear plate 6 may rotate relative to each other because an air gap magnetic field is not generated therebetween. The right second electromagnetic coil winding 141 does not apply electric current, so the iron core 16 in the right second electromagnetic coil winding 141 in the driving shear plate 5 and the permanent magnet 12 in one side, close to the driving shear plate 5, of the second driven shear plate 7 may rotate relative to each other because an air gap magnetic field is not generated therebetween. The left second electromagnetic coil winding 142 applies electric current, so the iron core 16 in the left second electromagnetic coil winding 142 in the driving shear plate 5 and the permanent magnet 12 in one side, close to the driving shear plate 5, of the first driven shear plate 6 are fixed relative to each other because an air gap magnetic field is generated therebetween. The transmission shaft 8 drives the driving shear plate 5 to rotate, and the first driven shear plate 6 rotates along with the driving shear plate 5, so eddy-current damping is generated by the iron core 16 in the first magnet yoke 10 and the permanent magnet 12, close to the first magnet yoke 10, in the first driven shear plate 6, and eddy-current damping is generated by the iron core 16 in the right second electromagnetic coil winding 141 in the driving shear plate 5 and the permanent magnet 12 in one side, close to the driving shear plate 5, of the second driven shear plate 7, so that middle-stage inertance coefficient and damping coefficient are provided.

In order to provide high-stage inertance coefficient and damping coefficient, further, neither the first electromagnetic coil winding 13 nor the third electromagnetic coil winding 15 applies electric current, so the iron core 16 in the surface of one side, far away from the second end cover 3, of the first magnet yoke 10 and the permanent magnet 12, close to the first magnet yoke 10, of the first driven shear plate 6 may rotate relative to each other because an air gap magnetic field is not generated therebetween, and the iron core 16 in the surface of one side, far away from the first end cover 2, of the second magnet yoke 11 and the permanent magnet 12 in one side, close to the second magnet yoke 11, of the second driven shear plate 7 may rotate relative to each other because an air gap magnetic field is not generated therebetween. Both the left second electromagnetic coil winding 142 and the right second electromagnetic coil winding 141 apply electric current, so the iron core 16 in the left second electromagnetic coil winding 142 in the driving shear plate 5 and the permanent magnet 12 in one side, close to the driving shear plate 5, of the first driven shear plate 6 are fixed relative to each other because an air gap magnetic field is generated therebetween, and the iron core 16 in the right second electromagnetic coil winding 141 in the driving shear plate 5 and the permanent magnet 12 in one side, close to the driving shear plate 5, of the second driven shear plate 7 are fixed relative to each other because an air gap magnetic field is generated therebetween. The transmission shaft 8 drives the driving shear plate 5 to rotate, and the first driven shear plate 6 and the second driven shear plate 7 rotate along with the driving shear plate 5, so eddy-current damping is generated by the iron core 16 in the surface of one side, far away from the second end cover 3, of the first magnet yoke 10 and the permanent magnet 12, close to the first magnet yoke 10, of the first driven shear plate 6, and eddy-current damping is generated by the iron core 16 in the surface of one side, far away from the first end cover 2, of the second magnet yoke 11 and the permanent magnet 12 in one side, close to the second magnet yoke 11, of the second driven shear plate 7, so that high-stage inertance coefficient and damping coefficient are provided.

In order to ensure the effectiveness of a magnetic path, further, the outer sleeve 1, the transmission shaft 8, the first end cover 2, and the second end cover 3 are all made of non-magnetically/electrically conductive materials; the driving shear plate 5, the first driven shear plate 6, and the second driven shear plate 7 are all made of magnetically/electrically conductive materials.

In order to generate uniform high magnetic flux density to form high and uniform magnetic flux density in the air gaps 17, further, the first magnet yoke 10, the first driven shear plate 6, the driving shear plate 5, the second driven shear plate 7, and the second yoke 11 are all of disc-shaped structures. At least one first electromagnetic coil winding 13 is arranged on the surface of one side, far away from the second end cover 3, of the first magnet yoke 10, and the first electromagnetic coil winding 13 is arranged around the transmission shaft 8 annularly. In the present disclosure, six first electromagnetic coil windings 13 are arranged on the surface of one side, far away from the second end cover 3, of the first magnet yoke 10. At least one permanent magnet 12 is arranged on each of the surfaces of the two sides of the first driven shear plate 6, and the permanent magnets 12 are arranged around the transmission shaft annularly. In the present disclosure, six permanent magnets 12 are arranged on each of the surfaces of the two sides of the first driven shear plate 6, and adjacent permanent magnets 12 have opposite magnetic pole directions and are perpendicular to a main plane of the disc of the first driven shear plate 6. At least one left second electromagnetic coil winding 142 and at least one right second electromagnetic coil winding 141 are arranged on each of the surfaces of the two sides of the driving shear plate 5 respectively. The second electromagnetic coil windings are arranged around the transmission shaft annularly. In the present disclosure, six left second electromagnetic coil windings 142 and six right second electromagnetic coil windings 141 are arranged on each of the surfaces of the two sides of the driving shear plate 5 respectively. At least one permanent magnet 12 is arranged on each of the surfaces of the two sides of the second driven shear plate 7, and the permanent magnets 12 are arranged around the transmission shaft annularly. In the present disclosure, six permanent magnets 12 are arranged on each of the surfaces of the two sides of the second driven shear plate 7, and the adjacent permanent magnets 12 have opposite magnetic pole directions and are perpendicular to a main plane of the disc of the second driven shear plate 7. At least one third electromagnetic coil winding 15 is arranged on the surface of one side, far away from the first end cover 2, of the second magnet yoke 11, and the third electromagnetic coil winding 15 is arranged around the transmission shaft annularly. In the present disclosure, six third electromagnetic coil windings 15 are arranged on the surface of one side, far away from the first end cover 2, of the second magnet yoke 11.

The present disclosure is described by preferred embodiments. Those skilled in the art know that various changes or equivalent substitutions can be made to these features and embodiments without departing from the spirit and scope of the present disclosure. The present disclosure is not limited by specific embodiments disclosed herein, and other embodiments falling within the claims of the application belong to the scope of protection of the present disclosure.

What is claimed is:

1. An electromagnetic multistage adjustable variable inertance and variable damping device, comprising an outer sleeve, a first end cover, and a second end cover; the outer sleeve, the first end cover, and the second end cover forming a built-in cavity, wherein the built-in cavity comprises a driving shear plate, a first driven shear plate, a second driven shear plate, a transmission shaft, a thrust bearing, a first magnet yoke, and a second magnet yoke;

the first magnet yoke is attached and fixed to the surface of one side, located in the built-in cavity, of the second end cover, and the second magnet yoke is attached and fixed to the surface of one side, located in the built-in cavity, of the first end cover;

iron cores are arranged on the surface of one side, far away from the second end cover, of the first magnet yoke, the surfaces of the two sides of the driving shear plate, and the surface of one side, far away from the first end cover, of the second magnet yoke, and the iron cores are all fixedly connected to the surface of one side, far away from the second end cover, of the first magnet yoke, the surfaces of the two sides of the driving shear plate, and the surface of one side, far away from the first end cover, of the second magnet yoke;

a first electromagnetic coil winding, a left second electromagnetic coil winding, a right second electromagnetic coil winding, and a third electromagnetic coil winding are arranged outside the iron cores in the surface of one side, far away from the second end cover, of the first magnet yoke, in the driving shear plate, and in the surface of one side, far away from the first end cover, of the second magnet yoke in sequence in a surrounding manner;

permanent magnets are arranged on the surfaces of both sides of the first driven shear plate and the second driven shear plate; the permanent magnets are annularly arranged around the transmission shaft; the permanent magnets are all fixedly connected to the surfaces of both sides of the first driven shear plate and the second driven shear plate;

air gaps are formed between the iron cores and the permanent magnets;

the driving shear plate and the transmission shaft are fixed integrally; the first driven shear plate is connected to the second driven shear plate through the thrust bearing and the transmission shaft; the first driven shear plate and the second driven shear plate may rotate relative to the transmission shaft.

2. The electromagnetic multistage adjustable variable inertance and variable damping device according to claim 1, wherein the first electromagnetic coil winding and the third electromagnetic coil winding apply electric current to magnetize the iron cores, so the iron core in the surface of one side, far away from the second end cover, of the first magnet yoke and the permanent magnet in one side, close to the first magnet yoke, of the first driven shear plate are fixed relative to each other because an air gap magnetic field is generated therebetween, and the iron core in the surface of one side, far away from the first end cover, of the second magnet yoke and the permanent magnet in one side, close to the second magnet yoke, of the second driven shear plate are fixed relative to each other because an air gap magnetic field is generated therebetween; neither the left second electromagnetic coil winding nor the right second electromagnetic coil winding applies electric current, so the iron cores in the surfaces of the two sides of the driving shear plate may rotate relative to the permanent magnet in one side, close to the driving shear plate, of the first driven shear plate as well as the permanent magnet in one side, close to the driving shear plate, of the second driven shear plate because air gap magnetic fields are not generated therebetween; the transmission shaft may drive the driving shear plate to rotate, so eddy-current damping is generated between the iron cores in the surfaces of the two sides of the driving shear plate and the permanent magnet in one side, close to the driving shear plate, of the first driven shear plate as well as the permanent magnet in one side, close to the driving shear plate, of the second driven shear plate, so that low-stage inertance coefficient and damping coefficient are provided.

3. The electromagnetic multistage adjustable variable inertance and variable damping device according to claim 1, wherein the first electromagnetic coil winding applies electric current, so the iron core in the surface of one side, far away from the second end cover, of the first magnet yoke and the permanent magnet in one side, close to the first magnet yoke, of the first driven shear plate are fixed relative to each other because an air gap magnetic field is generated therebetween; the third electromagnetic coil winding does not apply electric current, the iron core in the surface of one side, far away from the first end cover, of the second magnet yoke and the permanent magnet in one side, close to the second magnet yoke, of the second driven shear plate may rotate relative to each other because an air gap magnetic field is not generated therebetween; the left second electromagnetic coil winding does not apply electric current, the iron core in the left second electromagnetic coil winding in the driving shear plate and the permanent magnet in one side, close to the driving shear plate, of the first driven shear plate may rotate relative to each other because an air gap magnetic field is not generated therebetween; the right second electromagnetic coil winding applies electric current, the iron core in the right second electromagnetic coil winding in the driving shear plate and the permanent magnet in one side, close to the driving shear plate, of the second driven shear plate are fixed relative to each other because air gap magnetic field is generated therebetween; the transmission shaft drives the driving shear plate to rotate, and the second driven shear plate rotates along with the driving shear plate, so eddy-current damping is generated by the iron core in the left second electromagnetic coil winding in the driving shear plate and the permanent magnet in one side, close to the driving shear plate, of the first driven shear plate, and eddy-current damping is generated by the permanent magnet in one side, close to the second magnet yoke, of the second driven shear plate and the iron core in the surface of one surface, far away from the first end cover, of the second magnet yoke, so that middle-stage inertance coefficient and damping coefficient are provided.

4. The electromagnetic multistage adjustable variable inertance and variable damping device according to claim 1, wherein the third electromagnetic coil winding applies electric current, so the iron core in the surface of one side, far away from the first end cover, of the second magnet yoke and the permanent magnet in one side, close to the second magnet yoke, of the second driven shear plate are fixed relative to each other because an air gap magnetic field is generated therebetween; the first electromagnetic coil winding does not apply electric current, so the iron core in the surface of one side, far away from the second end cover, of the first magnet yoke and the permanent magnet in one side, close to the first magnet yoke, of the first second driven shear plate may rotate relative to each other because an air gap magnetic field is not generated therebetween; the right second electromagnetic coil winding does not apply electric current, so the iron core in the right second electromagnetic coil winding in the driving shear plate and the permanent magnet in one side, close to the driving shear plate, of the second driven shear plate may rotate relative to each other because an air gap magnetic field is not generated therebetween; the left second electromagnetic coil winding applies electric current, so the iron core in the left second electromagnetic coil winding in the driving shear plate and the permanent magnet in one side, close to the driving shear plate, of the first driven shear plate are fixed relative to each other because an air gap magnetic field is generated therebetween; the transmission shaft drives the driving shear plate to rotate, and the first driven shear plate rotates along with the driving shear plate, so eddy-current damping is generated by the iron core in the first magnet yoke and the permanent magnet, close to the first magnet yoke, in the first driven shear plate, and eddy-current damping is generated by the iron core in the right second electromagnetic coil winding in the driving shear plate and the permanent magnet in one side, close to the driving shear plate, of the second driven shear plate, so that middle-stage inertance coefficient and damping coefficient are provided.

5. The electromagnetic multistage adjustable variable inertance and variable damping device according to claim 1, wherein neither the first electromagnetic coil winding nor the third electromagnetic coil winding applies electric current, so the iron core in the surface of one side, far away from the second end cover, of the first magnet yoke and the permanent magnet, close to the first magnet yoke, of the first driven shear plate may rotate relative to each other because an air gap magnetic field is not generated therebetween, and the iron core in the surface of one side, far away from the first end cover, of the second magnet yoke and the permanent magnet in one side, close to the second magnet yoke, of the second driven shear plate may rotate relative to each other because an air gap magnetic field is not generated therebetween; both the left second electromagnetic coil winding and the right second electromagnetic coil winding apply electric current, so the iron core in the left second electromagnetic coil winding in the driving shear plate and the permanent magnet in one side, close to the driving shear plate, of the first driven shear plate are fixed relative to each other because an air gap magnetic field is generated therebetween, and the iron core in the right second electromagnetic coil winding in the driving shear plate and the permanent magnet in one side, close to the driving shear plate, of the second driven shear plate are fixed relative to each other because an air gap magnetic field is generated therebetween; the transmission shaft drives the driving shear plate to rotate, and the first driven shear plate and the second driven shear plate rotate along with the driving shear plate, so eddy-current damping is generated by the iron core in the surface of one side, far away from the second end cover, of the first magnet yoke and the permanent magnet, close to the first magnet yoke, of the first driven shear plate, and eddy-current damping is generated by the iron core in the surface of one side, far away from the first end cover, of the second magnet yoke and the permanent magnet in one side, close to the second magnet yoke, of the second driven shear plate, so that high-stage inertance coefficient and damping coefficient are provided.

6. The electromagnetic multistage adjustable variable inertance and variable damping device according to claim 1, wherein
the outer sleeve, the transmission shaft, the first end cover, and the second end cover are all made of non-magnetically/electrically conductive materials;
the driving shear plate, the first driven shear plate, and the second driven shear plate are all made of magnetically/electrically conductive materials.

7. The electromagnetic multistage adjustable variable inertance and variable damping device according to claim 1, wherein
the first magnet yoke, the first driven shear plate, the driving shear plate, the second driven shear plate, and the second yoke are all of disc-shaped structures;
at least one first electromagnetic coil winding is arranged on the surface of one side, far away from the second end cover, of the first magnet yoke, and the first electromagnetic coil winding is arranged around the transmission shaft annularly; in the present disclosure, six first electromagnetic coil windings are arranged on the surfaces of one side, far away from the second end cover, of the first magnet yoke;
at least one permanent magnet is arranged on each of the surfaces of the two sides of the first driven shear plate, and the permanent magnets are arranged around the transmission shaft annularly; in the present disclosure, six permanent magnets are arranged on each of the surfaces of the two sides of the first driven shear plate, and the adjacent permanent magnets have opposite magnetic pole directions and are perpendicular to a main plane of the disc of the first driven shear plate;
at least one left second electromagnetic coil winding and at least one right second electromagnetic coil winding are arranged on each of the surfaces of the two sides of the driving shear plate respectively, and the second electromagnetic coil windings are arranged around the transmission shaft annularly; in the present disclosure, six left second electromagnetic coil windings and six right second electromagnetic coil windings are arranged on each of the surfaces of the two sides of the driving shear plate respectively;
at least one permanent magnet is arranged on each of the surfaces of the two sides of the second driven shear plate, and the permanent magnets are arranged around the transmission shaft annularly; in the present disclosure, six permanent magnets are arranged on each of the surfaces of the two sides of the second driven shear plate, and the adjacent permanent magnets have opposite magnetic pole directions and are perpendicular to a main plane of the disc of the second driven shear plate;
at least one third electromagnetic coil winding is arranged on the surface of one side, far away from the first end cover, of the second magnet yoke; the third electromagnetic coil winding is arranged around the transmission shaft annularly; in the present disclosure, six third electromagnetic coil windings are arranged on the surface of one side, far away from the first end cover, of the second magnet yoke.

* * * * *